United States Patent
Wang et al.

(10) Patent No.: US 11,002,934 B2
(45) Date of Patent: May 11, 2021

(54) FIBER OPTIC CONNECTION ASSEMBLY

(71) Applicant: CommScope Telecommunications (Shanghai) Co. Ltd., Shanghai (CN)

(72) Inventors: Zhengbin Wang, Shanghai (CN); Wenyong Fan, Shanghai (CN); Jianfeng Jin, Shanghai (CN); Xin Tian, Shanghai (CN); Liming Wang, Shanghai (CN)

(73) Assignee: CommScope Telecommunications (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/710,483

(22) Filed: Sep. 20, 2017

(65) Prior Publication Data

US 2018/0100982 A1  Apr. 12, 2018

Related U.S. Application Data

(63) Continuation of application No. 14/782,934, filed as application No. PCT/IB2014/060209 on Mar. 27, 2014, now abandoned.

(30) Foreign Application Priority Data

Apr. 7, 2013 (CN) .......................... 201310117198.7
Apr. 7, 2013 (CN) .......................... 201320169165.2

(51) Int. Cl.
    *G02B 6/44* (2006.01)
    *G02B 6/38* (2006.01)

(52) U.S. Cl.
    CPC ......... *G02B 6/4471* (2013.01); *G02B 6/3821* (2013.01); *G02B 6/3825* (2013.01);
    (Continued)

(58) Field of Classification Search
    CPC .................. G02B 6/3825; G02B 6/4471–4473
    See application file for complete search history.

(56) References Cited

U.S. PATENT DOCUMENTS 5,125,060 A   6/1992   Edmundson
5,966,489 A   10/1999  Harwell et al.
(Continued)

FOREIGN PATENT DOCUMENTS

| EP | 2 330 770 A1 | 6/2011 |
| WO | 2006/113726 A1 | 10/2006 |
| WO | 2014/123940 A1 | 8/2014 |

OTHER PUBLICATIONS

International Search Report for International Application No. PCT/IB2014/060209 dated Jul. 23, 2014 (2 pages).
(Continued)

*Primary Examiner* — Chris H Chu
(74) *Attorney, Agent, or Firm* — Merchant & Gould P.C.

(57) ABSTRACT

A fiber optic connection assembly for fiber to the home, comprising: a fan-out member; a multi-fiber optical cable having a first end introduced into the fan-out member and a second end extending out of the fan-out member; a multi-fiber optic connector connected to the second end of the multi-fiber optical cable; a plurality of single-fiber optical cables each having a first end introduced into the fan-out member and spliced with a respective one of fibers of the multi-fiber optical cable and a second end extending out of the fan-out member; and a plurality of single-fiber optic connectors connected to the second ends of the single-fiber optical cables, respectively; a plurality of first fiber optic adapters mated with the plurality of single-fiber optic connectors, respectively; and a plurality of outer shields each constructed to receive the connector and the adapter of a respective single-fiber optical cable therein, wherein the outer shield is hermetically fitted on the connector and the (Continued)

adapter of the respective single-fiber optical cable to form a sealed inner chamber so as to prevent moisture or water from entering into the inner chamber.

20 Claims, 8 Drawing Sheets

(52) U.S. Cl.
CPC ......... *G02B 6/3885* (2013.01); *G02B 6/3887* (2013.01); *G02B 6/3897* (2013.01); *G02B 6/4453* (2013.01); *G02B 6/4494* (2013.01)

(56) References Cited

U.S. PATENT DOCUMENTS

| | | | |
|---|---|---|---|
| RE36,592 E | 2/2000 | Giebel et al. | |
| 6,104,855 A | 8/2000 | Jeon | |
| 6,856,748 B1* | 2/2005 | Elkins, II | G02B 6/3825 385/100 |
| 7,218,827 B2 | 5/2007 | Vongseng et al. | |
| 7,277,614 B2 | 10/2007 | Cody et al. | |
| 7,277,620 B2 | 10/2007 | Vongseng et al. | |
| 7,428,366 B2 | 9/2008 | Mullaney et al. | |
| 7,515,805 B2 | 4/2009 | Vongseng et al. | |
| 7,519,259 B2 | 4/2009 | Vongseng et al. | |
| 7,686,519 B2 | 3/2010 | Lu | |
| 7,809,233 B2 | 10/2010 | Smith et al. | |
| 7,809,234 B2 | 10/2010 | Smith et al. | |
| 7,826,706 B2 | 11/2010 | Vongseng et al. | |
| 8,184,940 B2 | 5/2012 | Smith et al. | |
| 8,538,228 B2 | 9/2013 | Smith et al. | |
| 8,818,158 B2 | 8/2014 | Smith et al. | |
| 9,201,206 B2 | 12/2015 | Smith et al. | |
| 9,341,798 B2 | 5/2016 | Smith et al. | |
| 2003/0063867 A1* | 4/2003 | McDonald | G02B 6/3869 385/78 |
| 2005/0103515 A1* | 5/2005 | Fuller | G02B 6/4453 174/50 |
| 2005/0259928 A1 | 11/2005 | Elkins, II et al. | |
| 2006/0127026 A1 | 6/2006 | Beck | |
| 2006/0133758 A1* | 6/2006 | Mullaney | G02B 6/3825 385/139 |
| 2006/0147172 A1 | 7/2006 | Luther et al. | |
| 2006/0165366 A1 | 7/2006 | Feustel et al. | |
| 2006/0204198 A1* | 9/2006 | Michiels | G02B 6/4446 385/135 |
| 2006/0233507 A1* | 10/2006 | Makrides-Saravanos | G02B 6/4453 385/135 |
| 2006/0269208 A1 | 11/2006 | Allen et al. | |
| 2007/0003204 A1 | 1/2007 | Makrides-Saravanos et al. | |
| 2008/0112681 A1 | 5/2008 | Battey et al. | |
| 2008/0310796 A1 | 12/2008 | Lu | |
| 2009/0148101 A1 | 6/2009 | Lu et al. | |
| 2009/0148118 A1* | 6/2009 | Gronvall | G02B 6/4441 385/135 |
| 2009/0310929 A1 | 12/2009 | Reinhardt et al. | |
| 2010/0086260 A1 | 4/2010 | Parikh et al. | |
| 2010/0195970 A1 | 8/2010 | Mudd et al. | |
| 2010/0303431 A1* | 12/2010 | Cox | G02B 6/4472 385/135 |
| 2011/0075968 A1 | 3/2011 | Cao et al. | |
| 2011/0311193 A1* | 12/2011 | Bryon | G02B 6/4471 385/135 |
| 2012/0014651 A1* | 1/2012 | Nad | G02B 6/4472 385/109 |
| 2013/0020771 A1* | 1/2013 | Vanhentenrijk | F16J 15/102 277/605 |
| 2013/0209049 A1* | 8/2013 | Kowalczyk | G02B 6/4457 385/135 |
| 2014/0219621 A1 | 8/2014 | Barnette, Jr. et al. | |
| 2014/0241670 A1 | 8/2014 | Barnette, Jr. et al. | |
| 2016/0124173 A1 | 5/2016 | Kowalczyk et al. | |
| 2017/0052332 A1 | 2/2017 | Smith et al. | |

OTHER PUBLICATIONS

International Written Opinion for International Application No. PCT/IB2014/060209 dated Jul. 23, 2014 (4 pages).

\* cited by examiner

FIBER OPTIC CONNECTION ASSEMBLY

CROSS-REFERENCE TO RELATED APPLICATION

This is a Continuation of U.S. patent application Ser. No. 14/782,934, filed Oct. 7, 2015, now abandoned, which is a National Stage of PCT/I132014/060209, filed Mar. 27, 2014, which claims the benefit of Chinese Patent Application No. 201310117198.7 filed on Apr. 7, 2013 and Chinese Patent Application No. 201320169165.2 filed on Apr. 7, 2013 and which applications are incorporated herein by reference. To the extent appropriate, a claim of priority is made to each of the above disclosed applications.

BACKGROUND OF THE INVENTION

Field of the Invention

The present invention relates to a fiber optic connection assembly, more particularly, relates to a fiber optic connection assembly for fiber to the home (FTTH).

Description of the Related Art

In a conventional technology of fiber to the home (FTTH), a fiber optic connection box is commonly used to couple fibers of a multi-fiber optical cable to respective fibers of single-fiber optical cables of a user side. For example, FIG. 1 is an illustrative perspective view of a conventional fiber optic connection box 10, and FIG. 2 shows the fiber optic connection box 10 of FIG. 1 after a cover 14 is removed from a body 12.

As shown in FIGS. 1-2, the fiber optic connection box mainly comprises the body 12 and the cover 14. A multi-fiber optical cable 16 containing a plurality of fibers is introduced into the body 12 from an end of the fiber optic connection box 10. A plurality of fiber optic adapters 18 are provided on a back side of the body 12. The fiber optic adapter 18 each comprises an internal port located inside the body 12 and an external port located outside the body 12. When the fiber optic adapter 18 is not in use, the external port is often sealed by a sealing cap 19. When it needs to operate the external port, the sealing cap 19 can be simply removed.

Referring to FIGS. 1-2 again, the plurality of fibers 11 of the multi-fiber optical cable 16 are coupled to a plurality of single-fiber optic connectors 13, respectively. The single-fiber optic connector 13 is fitted in the internal port of the fiber optic adapter 18. When a single-fiber optic connector of the user side is fitted in the external port of the fiber optic adapter 18 after the sealing cap 19 is removed from the external port, the single-fiber optic connector 13 is coupled to the single-fiber optic connector of the user side, and the fiber of the multi-fiber optical cable 16 is optically coupled to the fiber of the single-fiber optic connector of the user side.

Please refer to FIGS. 1-2, the fiber optic connectors 13 and adapters 18 are all provided in the fiber optic connection box 10. Therefore, the conventional fiber optic connection box 10 has a large size and cannot be used in a narrow workspace, for example, in a well. Accordingly, the conventional fiber optic connection box 10 is limited in the practical application. Further, the cost of the conventional fiber optic connection box 10 is very high.

Furthermore, as shown in FIGS. 1-2, the fiber optic adapters 18 are fixed on the body 12 of the fiber optic connection box 10, therefore, the single-fiber optical cable from the user side must have an enough length to be coupled to the fiber optic connector 18. If the single-fiber optical cable from the user side is too short to reach the fiber optic connector 18, the single-fiber optical cable from the user side must be replaced, complicating the operation of coupling fibers.

SUMMARY OF THE INVENTION

The present invention has been made to overcome or alleviate at least one aspect of the above mentioned disadvantages.

Accordingly, it is an object of the present invention to provide a fiber optic connection assembly having a small volume and adapted to be used in a narrow workspace.

According to an aspect of the present invention, there is provided a fiber optic connection assembly for fiber to the home, comprising: a fan-out member; a multi-fiber optical cable having a first end introduced into the fan-out member and a second end extending out of the fan-out member; a multi-fiber optic connector connected to the second end of the multi-fiber optical cable; a plurality of single-fiber optical cables each having a first end introduced into the fan-out member and a second end extending out of the fan-out member; and a plurality of single-fiber optic connectors connected to the second ends of the single-fiber optical cables, respectively; a plurality of first fiber optic adapters mated with the plurality of single-fiber optic connectors, respectively; and a plurality of outer shields each constructed to receive the connector and the adapter of a respective single-fiber optical cable therein, wherein the outer shield is hermetically fitted on the connector and the adapter of the respective single-fiber optical cable to form a sealed inner chamber so as to prevent moisture or water from entering into the inner chamber.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
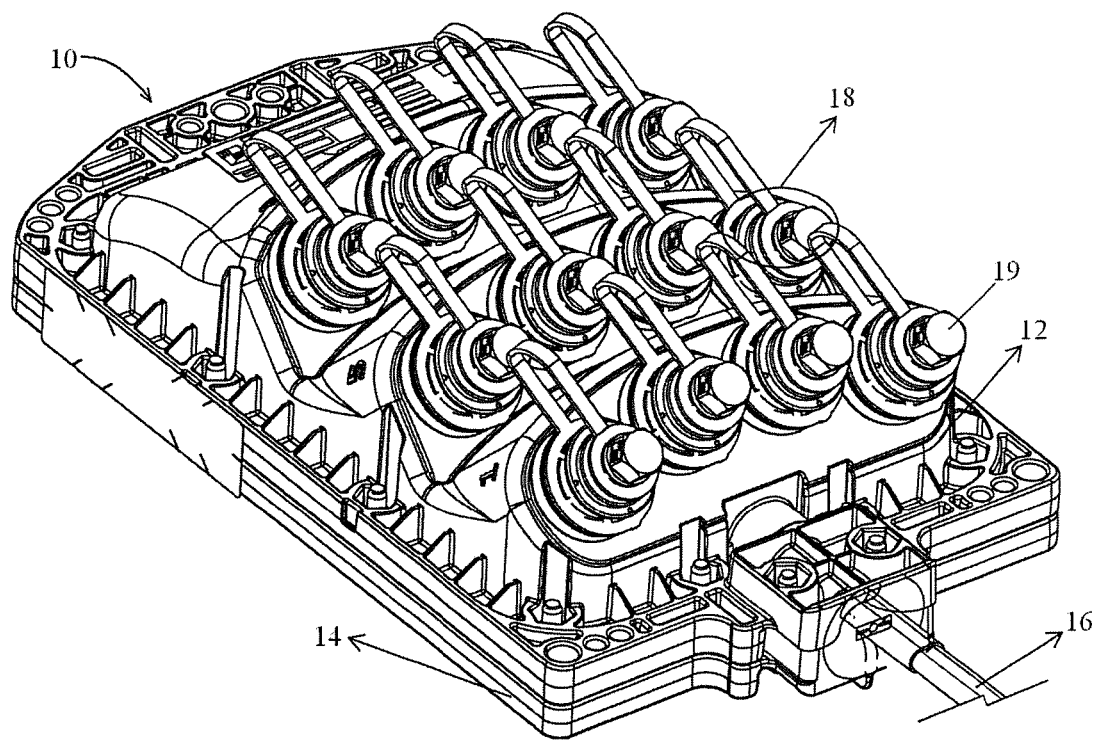
FIG. 1 is an illustrative perspective view of a conventional fiber optic connection box.
Figure 2:
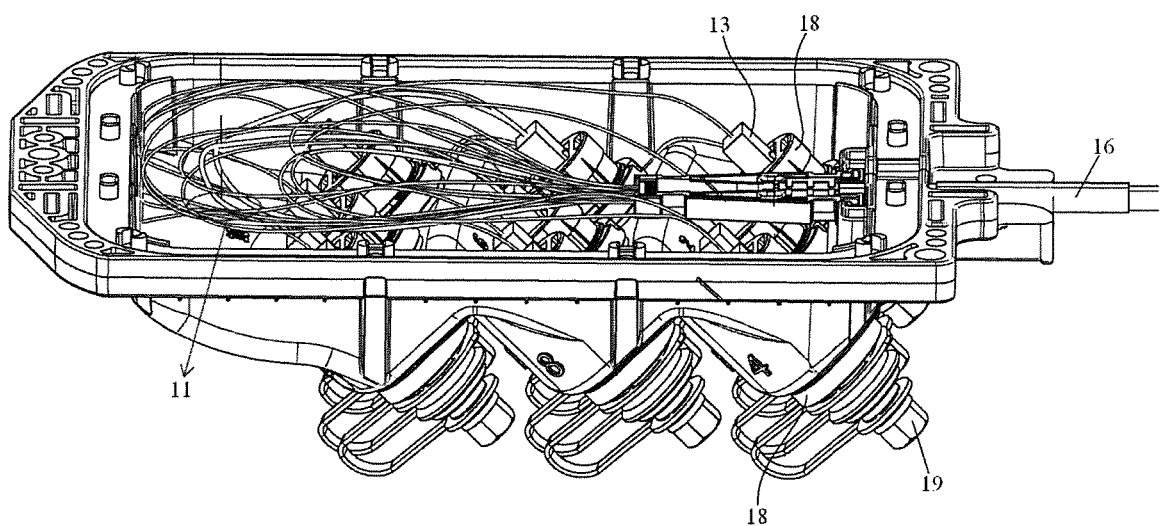
FIG. 2 shows the fiber optic connection box of FIG. 1, wherein a cover has been removed from a body.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 3:
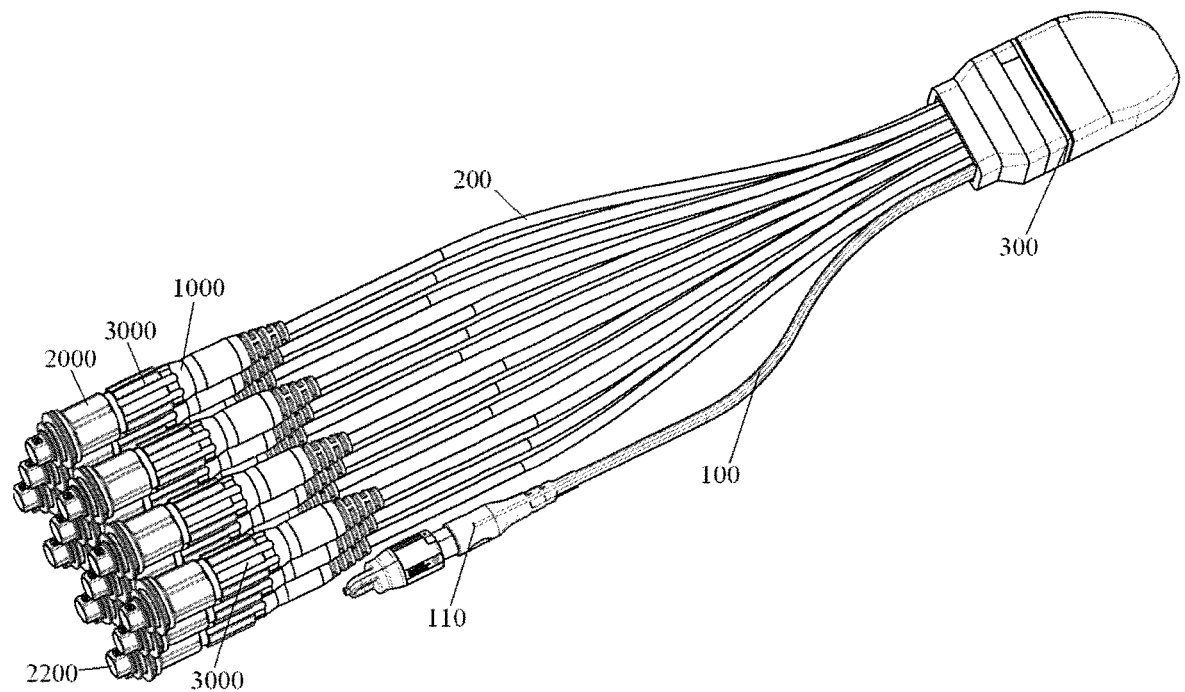
FIG. 3 is an illustrative perspective view of a fiber optic connection assembly for fiber to the home according to an exemplary embodiment of the present invention.

FIG. 3 is an illustrative perspective view of a fiber optic connection assembly for fiber to the home according to an exemplary embodiment of the present invention.

As shown in FIG. 3, the fiber optic connection assembly mainly comprises a multi-fiber optical cable 100, a plurality of single-fiber optical cables 200 and a fan-out member 300.

Referring to FIG. 3, the multi-fiber optical cable 100 has a first end introduced into the fan-out member 300 and a second end extending out of the fan-out member 300. A multi-fiber optic connector 110 is hermetically connected to the second end of the multi-fiber optical cable 100. The multi-fiber optic connector 110 may be coupled to another mating multi-fiber optic connector (not shown) by a fiber optic adapter.

Please refer to FIG. 3 again, the plurality of single-fiber optical cables 200 each has a first end introduced into the fan-out member 300 and a second end extending out of the fan-out member 300. A plurality of single-fiber optic connectors 1000 are connected to the second ends of the single-fiber optical cables 200, respectively. The single-fiber optic connectors 1000 each may be coupled to another mating single-fiber optic connector (not shown) from a user side by a fiber optic adapter 2000.

Figure 6:
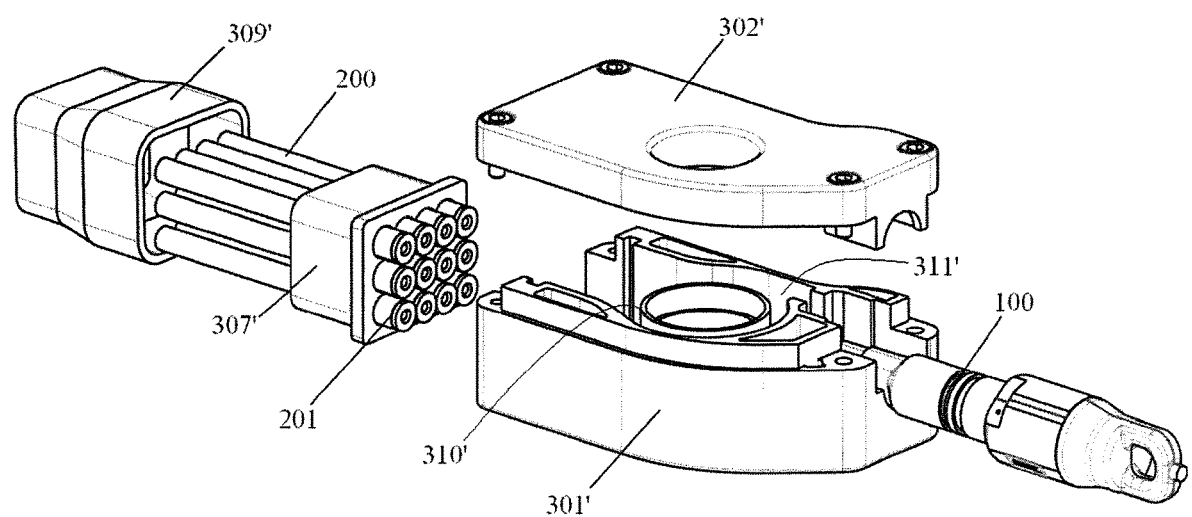
FIG. 6 is an illustrative exploded perspective view of a fan-out member according to another exemplary embodiment of the present invention.
Figure 7:
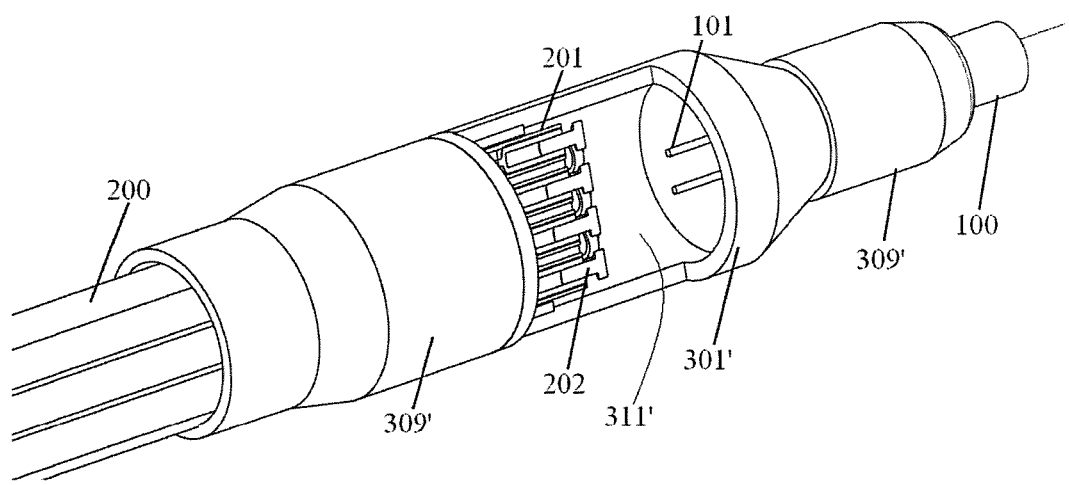
FIG. 7 is an illustrative exploded perspective view of a fan-out member according to yet another exemplary embodiment of the present invention.
Figure 9:
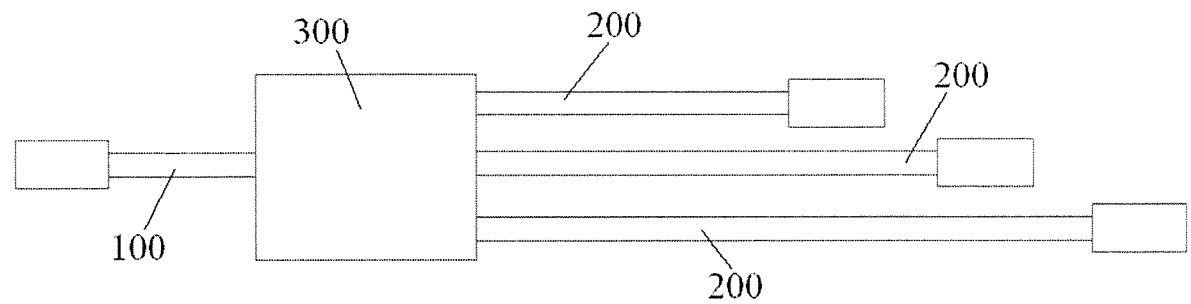
FIG. 9 is an illustrative view of a fiber optic connection assembly according to yet another exemplary embodiment of the present invention.

In the illustrated embodiment of FIG. 3, the multi-fiber optical cable 100 and the single-fiber optical cables 200 are introduced into the fan-out member 300 from the same side of the fan-out member 300. But the present invention is not limited to this, in other embodiments, the multi-fiber optical cable 100 and the single-fiber optical cables 200 may be introduced into the fan-out member 300 from different sides of the fan-out member 300, as shown in FIGS. 6-7 and 9.

Figure 8:
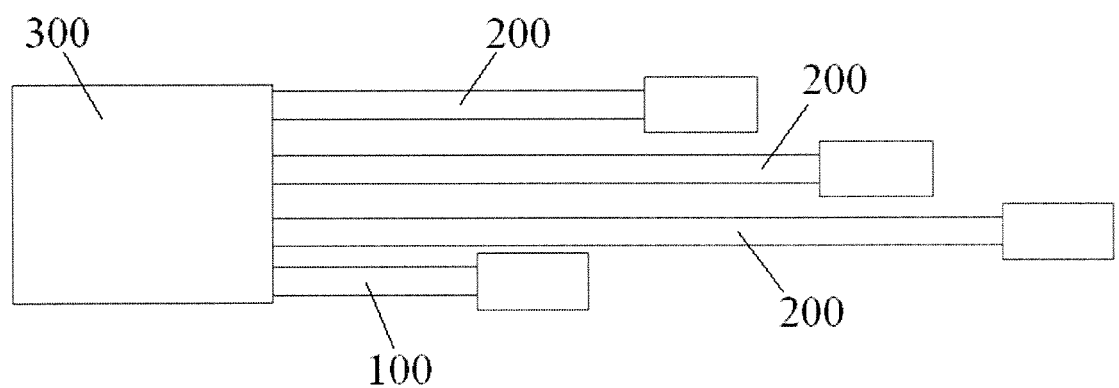
FIG. 8 is an illustrative view of a fiber optic connection assembly according to another exemplary embodiment of the present invention.

Please refer to FIG. 3 again, in an exemplary embodiment, the single-fiber optical cables 200 have the same length extending out of the fan-out member 300. But the present invention is not limited to this, in other embodiments, the single-fiber optical cables 200 may have different lengths extending out of the fan-out member 300, as shown in FIGS. 8-9.

In the illustrated embodiment of FIG. 3, there are provided twelve single-fiber optical cables 200. The twelve single-fiber optical cables 200 are divided into three groups. Each group of single-fiber optical cables 200 has four single-fiber optical cables 200. As shown in FIG. 3, the single-fiber optic connectors 1000 of the same one group of single-fiber optical cables 200 are arranged in the same layer; and the single-fiber optic connectors 1000 of different groups of single-fiber optical cables 200 are arranged in different layers and may be held in different layers by, for example, a locking mechanism.

Please be noted that the present invention is not limited to the illustrated embodiments, the number and the arrangement of the single-fiber optical cables 200 may be freely adjusted as necessary.

As shown in FIG. 3, each group of single-fiber optical cables 200 have a same length extending out of the fan-out member 300; and different groups of single-fiber optical cables 200 also have the same length extending out of the fan-out member 300. But the present invention is not limited to this, in other embodiments, the different groups of single-fiber optical cables 200 may have different lengths extending out of the fan-out member 300, as shown in FIGS. 8-9.

Referring to FIG. 3, in an exemplary embodiment of the present invention, the single-fiber optic connector 1000 may be configured to be a sealed type of fiber optic connector to have excellent waterproof performance.

In an exemplary embodiment of the present invention, as shown in FIG. 3, the fiber optic connection assembly may further comprises a plurality of first fiber optic adapters 2000 mated with the plurality of single-fiber optic connectors 1000, respectively. The single-fiber optic connector 1000 may be coupled to another mating single-fiber optic connector (not shown) from a user side by the fiber optic adapter 2000.

In an exemplary embodiment of the present invention, as shown in FIG. 3, the fiber optic connection assembly may further comprises a second fiber optic adapter (not shown in FIG. 3) mated with the multi-fiber optic connector 110. The multi-fiber optic connector 110 may be hermetically fitted in the second fiber optic adapter.

Figure 4:
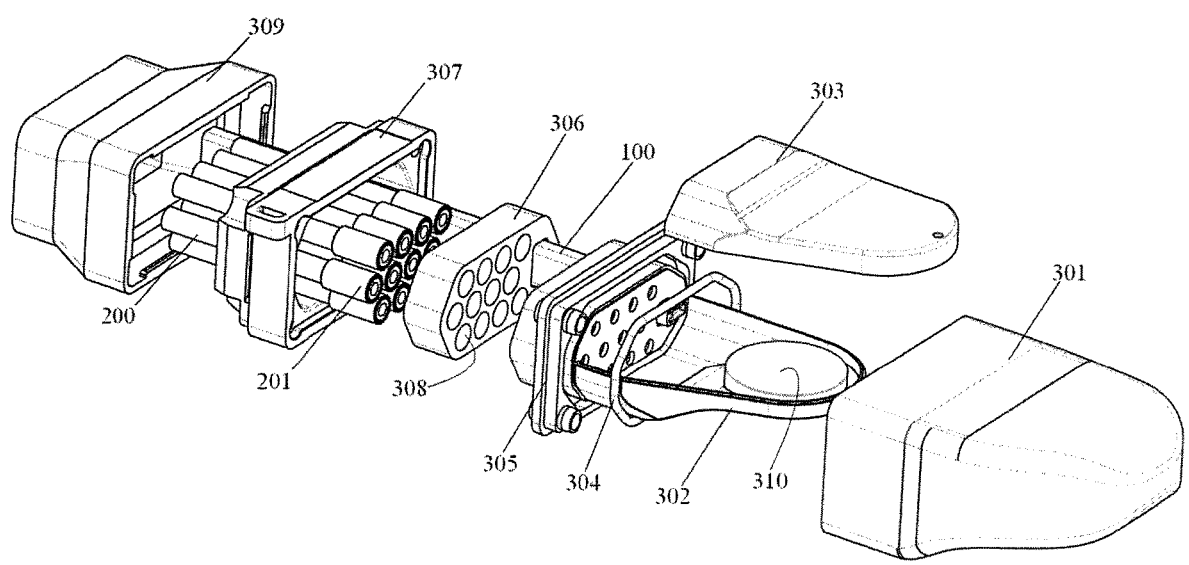
FIG. 4 is an illustrative exploded perspective view of a fan-out member according to an exemplary embodiment of the present invention.
Figure 5:
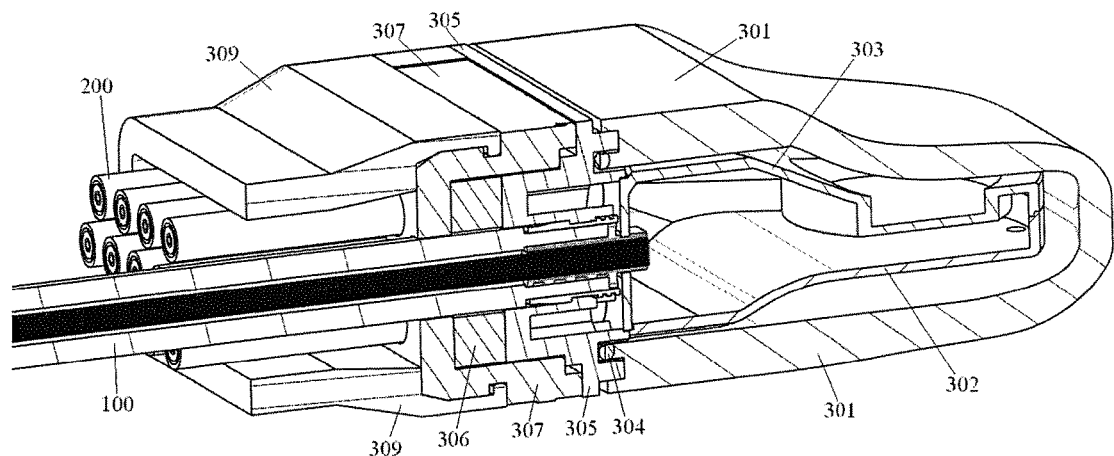
FIG. 5 is a cross section view of the fan-out member of FIG. 4 after it has been assembled.

FIG. 4 is an illustrative exploded perspective view of a fan-out member 300 according to an exemplary embodiment of the present invention; FIG. 5 is a cross section view of the fan-out member 300 of FIG. 4 after it has been assembled.

As shown in FIGS. 3-5, there is not provided any fiber optic connector and fiber optic adapter in the fan-out member 300. The fiber optic connector 110, 1000 and fiber optic adapters 2000 are all disposed on ends of the respective optical cables 100, 200 extending outside of the fan-out member 300.

In an exemplary embodiment of the present invention, the single-fiber optic connectors of the fiber optic connection assembly and the mating single-fiber optic connector (not shown) from the user side are hermetically fitted in the first fiber optic adapters 2000.

As shown in FIG. 3, before the mating single-fiber optic connector of the user side is fitted into a respective port of the first fiber optic adapter 2000, the respective port of the first fiber optic adapter 2000 may be provisionally sealed by a sealing cap 2200. When it needs to fit the mating single-fiber optic connector of the user side into the respective port of the first fiber optic adapter 2000, the sealing cap 2200 may be simply removed, and the mating single-fiber optic connector of the user side can be inserted into the respective port of the first fiber optic adapter 2000. In this way, the fiber of the single-fiber optical cable 200 can be optically coupled to a mating fiber of the single-fiber optical cable of the user side.

In the illustrated embodiments, the multi-fiber optical cable 100 and the single-fiber optical cables 200 are hermetically fitted in the fan-out member 300. Hereafter, it will describe the sealing manners of the multi-fiber optical cable 100 and the single-fiber optical cables 200 in detail according to several embodiments.

As shown in FIGS. 4-5, the multi-fiber optical cable 100 and the single-fiber optical cables 200 are hermetically fitted in the fan-out member 300 by pressing a sealing gel block 306.

In the illustrated embodiment of FIGS. 4-5, the fan-out member 300 mainly comprises a housing 301, a tray 302, 303, a first pressing plate 305, the sealing gel block 306, and a second pressing plate 307.

As shown in FIGS. 4-5, the tray 302, 303 is received in the housing 301 to store and manage the fibers of the multi-fiber optical cable 100. The tray 302, 303 comprises a body 302 and cover 303 fitted or sealed on the body 302. In addition the tray 302, 303 contains a pillar 310 inside thereof. The redundant fibers of the multi-fiber optical cable 100 may be wound on the pillar 310.

As shown in FIGS. 4-5, the first pressing plate 305 may be hermetically fitted in the housing 301 by a sealing ring 304.

As shown in FIGS. 4-5, the second pressing plate 307 is disposed at a side of the first pressing plate 305 opposite to the housing 301, and the sealing gel block 306 is received in an inner space defined by the first and second pressing plates 305, 307.

Please refer to FIGS. 4-5 again, the first end of the multi-fiber optical cable 100 extends into the housing 301 after passing through the second pressing plate 307, the sealing gel block 306 and the first pressing plate 305. The first ends of fibers of the single-fiber optical cable 200 are received in holes 308 formed in the sealing gel block 306, respectively, after passing through holes formed in the second pressing plate 307.

In the illustrated embodiment of FIGS. 4-5, the housing 301, the sealing gel block 306 and the second pressing plate 307 may be assembled together by bolts. In this case, the sealing gel block 306 and the sealing ring 304 can be pressed by screwing the bolts, so that the multi-fiber optical cable 100 and the single-fiber optical cable 200 can be hermetically fitted in the fan-out member 300 (the fibers of the multi-fiber optical cable 100 and the single-fiber optical cable 200 can be hermetically sealed in the fan-out member 300).

Referring to FIGS. 4-5, the multi-fiber optical cable 100 is fixed to the first pressing plate 305 with, for example, epoxy glue. As a result, an external force exerted on the multi-fiber optical cable 100 is transferred to the housing 301 rather than the fibers of the multi-fiber optical cable 100.

Referring to FIGS. 4-5, a crimp ring 201 is crimped on the first end of the single-fiber optical cable 200, and the crimp ring 201 has a diameter larger than that of the hole in the second pressing plate 307 to prevent the single-fiber optical cable 200 from being disengaged from the second pressing plate 307, and transfer an external force exerted on the single-fiber optical cable 200 to the housing 301 rather than the fiber of the single-fiber optical cable 200.

As shown in FIGS. 4-5, the fan-out member 300 may further comprises an elastic tail sleeve 309 sleeved on the multi-fiber optical cable 100 and the single-fiber optical cables 200 and connected to the second pressing plate 307 at an end of the housing 301 to protect the multi-fiber optical cable 100 and the single-fiber optical cables 200 from being damaged by a lateral force.

FIG. 6 is an illustrative exploded perspective view of a fan-out member according to another exemplary embodiment of the present invention.

As shown in FIG. 6, the multi-fiber optical cable 100 and the single-fiber optical cable 200 are hermetically fitted in the fan-out member 300 by filling a sealing gel into the fan-out member 300.

Referring to FIG. 6, the fan-out member mainly comprises a housing 301', 302' and an end plate 307'. The housing 301', 302' defined a chamber 311' therein. The end plate 307' is fitted in a port of the housing 301', 302'. The housing 301', 302' comprises a body 301' and a cover 302' fitted on the body 301'.

Please refer to FIG. 6, the first end of the single-fiber optical cable 200 passes through a hole in the end plate 307' and extends into the chamber 311', and the first end of the multi-fiber optical cable 100 extends into the chamber 311' of the housing 301'. When the sealing gel is filled into the chamber 311' of the housing 301', 302', the multi-fiber optical cable 100 and the single-fiber optical cables 200 are sealed in the fan-out member 300.

As shown in FIG. 6, the multi-fiber optical cable 100 may be fixed to the housing 301' to transfer an external force exerted on the multi-fiber optical cable 100 to the housing 301' rather than the fibers of the multi-fiber optical cable 100.

Referring to FIG. 6 again, a crimp ring 201 is crimped on the first end of the single-fiber optical cable 200, and the crimp ring 201 has a diameter larger than that of the hole in the end plate 307' to prevent the single-fiber optical cable 200 from being disengaged from the end plate 307' and transfer an external force exerted on the single-fiber optical cable 200 to the housing 301' rather than the fiber of the single-fiber optical cable 200.

Please refer to FIG. 6, the fan-out member 300 may further comprises an elastic tail sleeve 309' sleeved on the single-fiber optical cables 200 and connected to the end plate 307' to protect the single-fiber optical cables 200 from being damaged by a lateral force.

As shown in FIG. 6, the fan-out member 300 may further comprises a tray 310' for store and managing the redundant fibers of the multi-fiber optical cable 100. The tray 310' is received in the chamber 311' of the housing 301'.

FIG. 7 is an illustrative exploded perspective view of a fan-out member according to yet another exemplary embodiment of the present invention.

As shown in FIG. 7, the fan-out member does not comprise a tray for managing the fibers of the multi-fiber optical cable 100, and Kevlar elements 101 of the multi-fiber optical cable 100 may be directly joined to the crimp ring 201 of the single-fiber optical cables 200 by a sealing gel. In this case, the fibers of the multi-fiber optical cable 100 can be directly spliced with the fibers of the single-fiber optical cables 200, respectively, without needing a tray to manage the fiber of the multi-fiber optical cable 100.

Referring to FIG. 7, Kevlar elements of the single-fiber optical cables 200 is disposed on a metal piece 202 and is crimped on the metal piece 202 by the crimp ring 201.

In the illustrated embodiment of FIG. 7, the fan-out member is configured to have a cylindrical housing 301'. The cylindrical fan-out member defines a chamber 311' in the housing 301'. When the sealing gel is filled into the chamber 311' of the housing 301', the multi-fiber optical cable 100 and the single-fiber optical cables 200 are sealed in the fan-out member 300.

As shown in FIG. 7, the single-fiber optical cables 200 are introduced into the fan-out member from one side of the fan-out member, and the multi-fiber optical cable 100 is introduced into the fan-out member from the other side of the fan-out member. An elastic tail sleeve 309' is sleeved on the multi-fiber optical cable 100 and connected to the housing 301' to protect the multi-fiber optical cable 100 from being damaged by a lateral force. Similarly, another elastic tail sleeve 309' is sleeved on the single-fiber optical cables 200 and connected to the housing 301' to protect the single-fiber optical cables 200 from being damaged by a lateral force.

Although several exemplary embodiments of the fan-out member have been shown and described with reference to FIGS. 4-7, the present invention is not limited to the illustrated embodiments. Many other suitable fan-out members may be made according to the teaching of the present invention. In an exemplary embodiment, the plurality of single-fiber optical cables 200 each may have a fiber spliced with a respective one of the plurality of fibers of the multi-fiber optical cable 100 in the fan-out member 300. In another exemplary embodiment, a splitter may be disposed in the fan-out member 300 to separate the multi-fiber optical cable 100 into a plurality of fibers, and the plurality of fibers of the multi-fiber optical cable 100 each may directly run through a respective one of the single-fiber optical cables 200 and is terminated at the single-fiber optic connector 1000 on the respective one of the single-fiber optical cables 200.

Hereafter, it will describe in detail a seal configuration for sealing the single-fiber optic connector 1000 and the adapter 2000 of each single-fiber optical cable 200 with reference to FIGS. 10-16.

Figure 10:
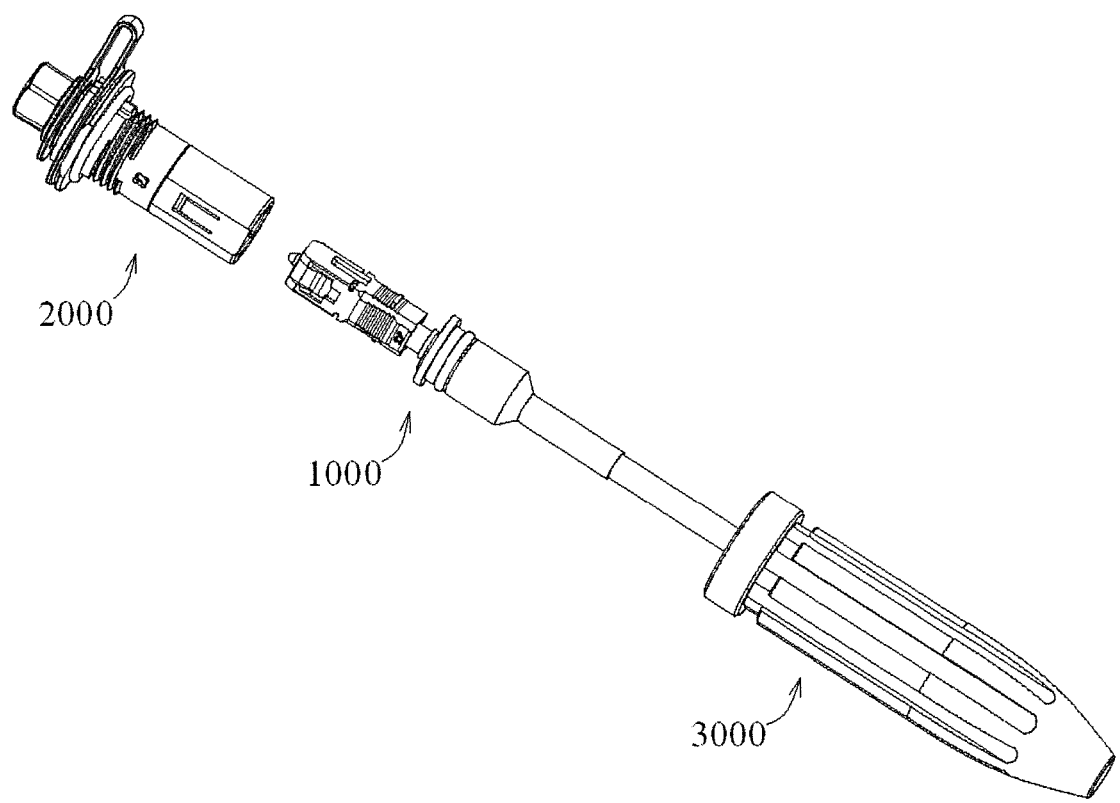
FIG. 10 is an illustrative exploded view of a fiber optic connection seal assembly for the fiber optic connection assembly of FIG. 3 according to an exemplary embodiment of the present invention.

FIG. 10 is an illustrative exploded view of a fiber optic connection seal assembly for the fiber optic connection assembly of FIG. 3 according to an exemplary embodiment of the present invention.

As shown in FIG. 10, the fiber optic connection seal assembly mainly comprises the fiber optic connector 1000, the fiber optic adapter 2000 and an outer shield 3000.

Figure 11:
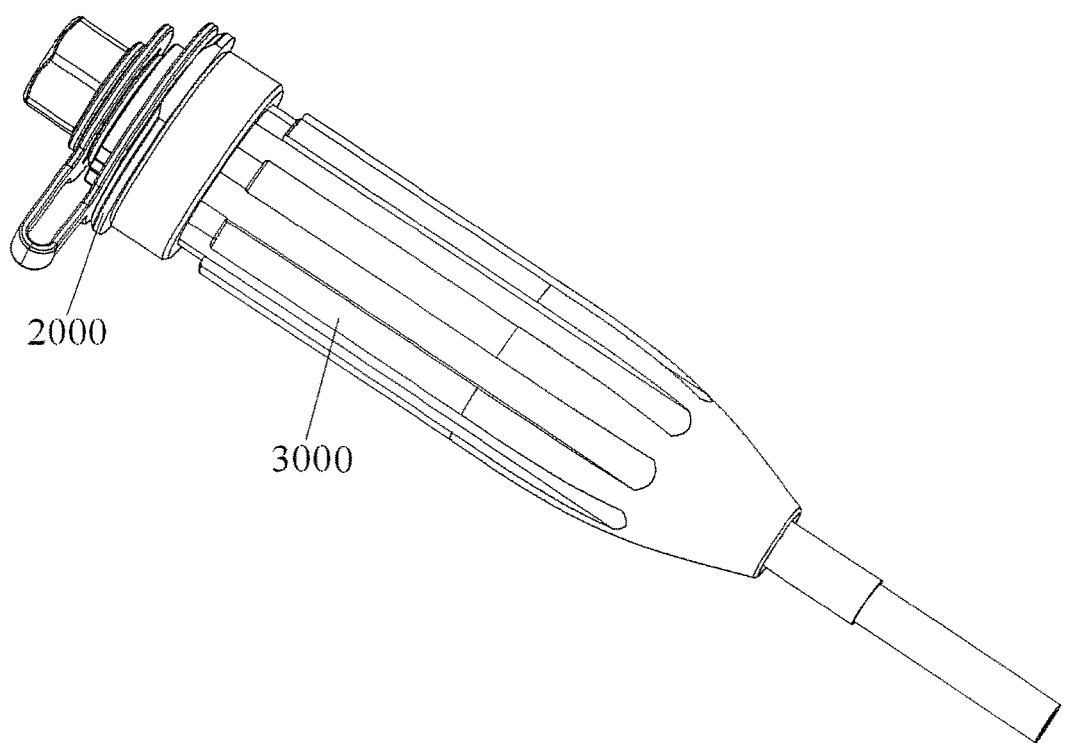
FIG. 11 is an illustrative assembled view of a fiber optic connection seal assembly according to an exemplary embodiment of the present invention.
Figure 13:
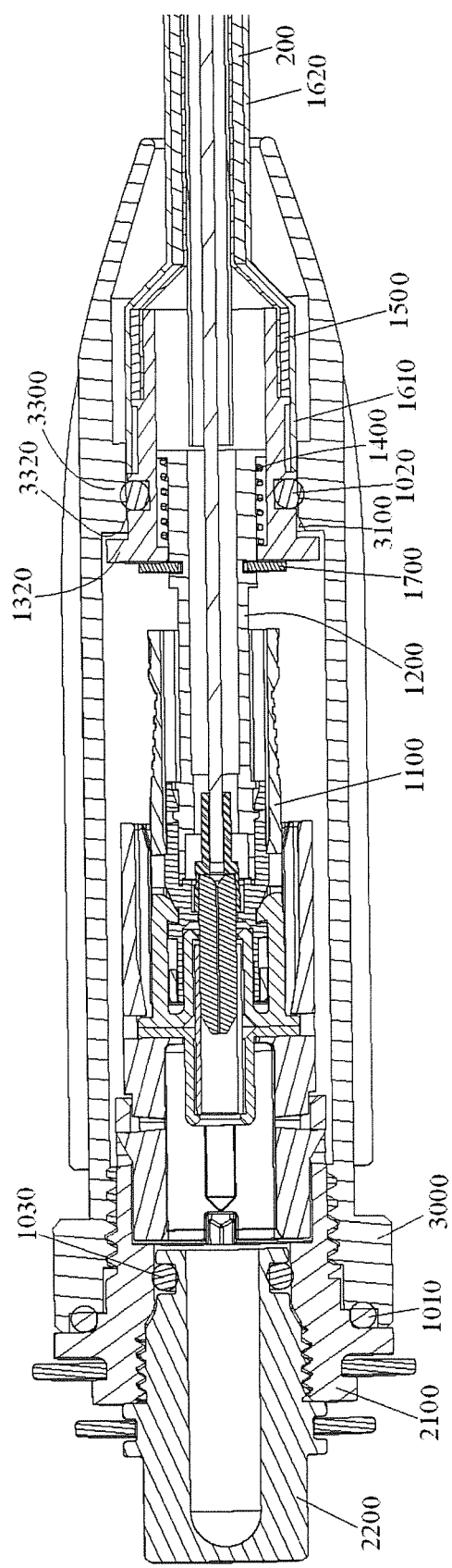
FIG. 13 is a cross section view of the fiber optic connection seal assembly of FIG. 11.

FIG. 11 is an illustrative assembled view of a fiber optic connection seal assembly according to an exemplary embodiment of the present invention; FIG. 13 is a cross section view of the fiber optic connection seal assembly of FIG. 11.

As shown in FIGS. 10-11 and 13, an end of an optical cable 1000 is inserted into and coupled to the fiber optic connector 1000. The fiber optic adapter 2000 is configured to position the fiber optic connector 1000 therein, so that the fiber optic connector 1000 is optically coupled with a mating fiber optic connector (not shown) in the fiber optic adapter 2000. The outer shield 3000 is disposed on the fiber optic connector 1000 and the fiber optic adapter 2000. The outer shield 3000 is hermetically fitted on the fiber optic connector 1000 and the fiber optic adapter 2000 to form a sealed inner chamber so as to prevent moisture or water from entering into the inner chamber.

In an exemplary embodiment, the fiber optic connector 1000 may comprise LC connector or other type of connector.

Please refer to FIG. 13, the outer shield 3000 has a first end and a second end opposite to the first end. The first end of the outer shield 3000 is screwed onto a housing 2100 of the fiber optic adapter 2000. A first elastic seal ring 1010 is interposed between an inner flange surface 3020 (see FIG. 14) of the first end of the outer shield 3000 and an outer flange surface (not indicated) of the housing 2100 of the fiber optic adapter 2000. When the outer shield 3000 is screwed onto the housing 2100 of fiber optic adapter 2000, the first elastic seal ring 1010 is axially pressed between the inner flange surface 3020 of the outer shield 3000 and the outer flange surface of the fiber optic adapter 2000 to seal an interface between the outer shield 3000 and the fiber optic adapter 2000.

In the illustrated embodiment of FIG. 13, when the outer shield 3000 is screwed in position on the fiber optic adapter 2000, for example, an end face of the first end of the outer shield 3000 becomes contact with the housing 2100 of the adapter 2000, the interface between the outer shield 3000 and the fiber optic adapter 2000 is sealed by the first elastic seal ring 1010.

Figure 12:
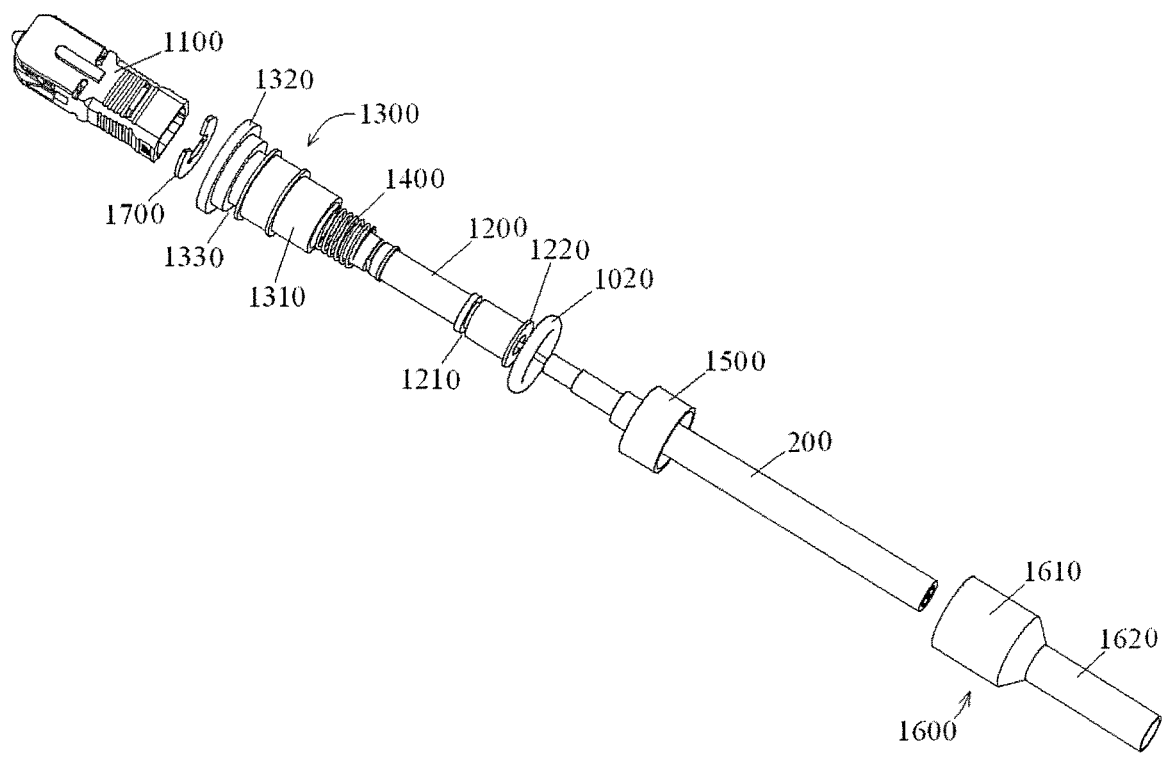
FIG. 12 is an illustrative perspective exploded view of a fiber optic connector of FIG. 10.

FIG. 12 is an illustrative perspective exploded view of the fiber optic connector 1000 of FIG. 10.

As shown in FIG. 12, the fiber optic connector 1000 comprises an outer tube 1300 having a groove 1330 formed in an outer wall of the outer tube 1300. A second elastic seal ring 1020 is received in the groove 1330. The outer tube 1300 may be made of metal.

Figure 14:
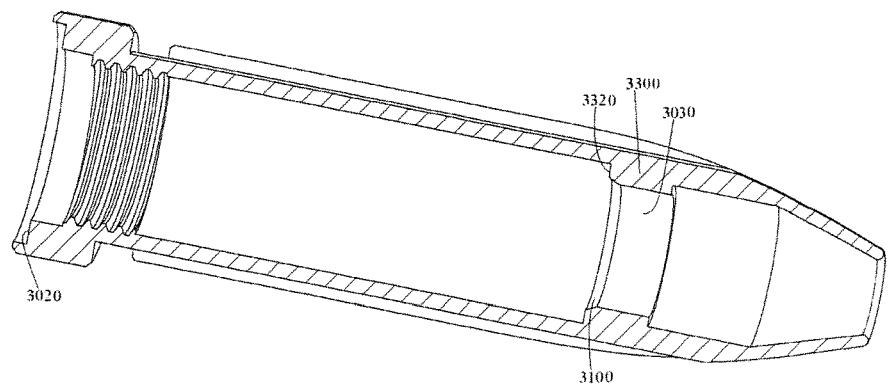
FIG. 14 is an enlarged cross section view of an outer shield of FIG. 10.

As shown in FIGS. 13-14, the outer shield 3000 is formed with a radial protrusion 3300 on an inner wall of the outer shield 3000 at the second end of the outer shield 3000. When the outer shield 3000 is screwed onto the housing 2100 of fiber optic adapter 2000, the second elastic seal ring 1020 is radially inward pressed in the groove 1330 by the an inner peripheral surface 3030 of the radial protrusion 3300 to seal an interface between the outer shield 3000 and the fiber optic connector 1000.

Referring to FIG. 13 again, the fiber optic adapter 2000 comprises a seal cap 2200 screwed into a port of the housing 2100 of the fiber optic adapter 2000 opposite to the fiber optic connector 1000. A third elastic seal ring 1030 is interposed between an outer peripheral surface of the seal cap 2200 and an inner peripheral surface of the housing 2100 of the fiber optic adapter 2000. When the seal cap 2200 is screwed into the port of fiber optic adapter 2000, the third elastic seal ring 1030 is radially inward pressed between the outer peripheral surface of the seal cap 2200 and the inner peripheral surface of the fiber optic adapter 2000 to seal an interface between the seal cap 2200 and the fiber optic adapter 2000.

In an exemplary embodiment of the present invention, when it needs to couple the fiber optic connector 1000 with a mating fiber optic connector (not shown), the seal cap 2200 may be removed, and the mating fiber optic connector may be inserted into the port of the fiber optic adapter 2000. In this way, the fiber optic connector 1000 is coupled with the mating fiber optic connector.

As shown in FIGS. 12-13, the fiber optic connector 1000 comprises a shrinkable tube 1600 having a first end 1610 firmly attached on a first end 1310 of the outer tube 1300 and a second end 1620 firmly attached on the optical cable 200 to seal an interface between the fiber optic connector 1000 and the optical cable 200.

As shown in FIGS. 13-14, the radial protrusion 3300 of the outer shield 3000 has a slope 3100 for guiding the second elastic seal ring 1020 to the inner peripheral surface 3030 of the radial protrusion 3300.

Figure 15:
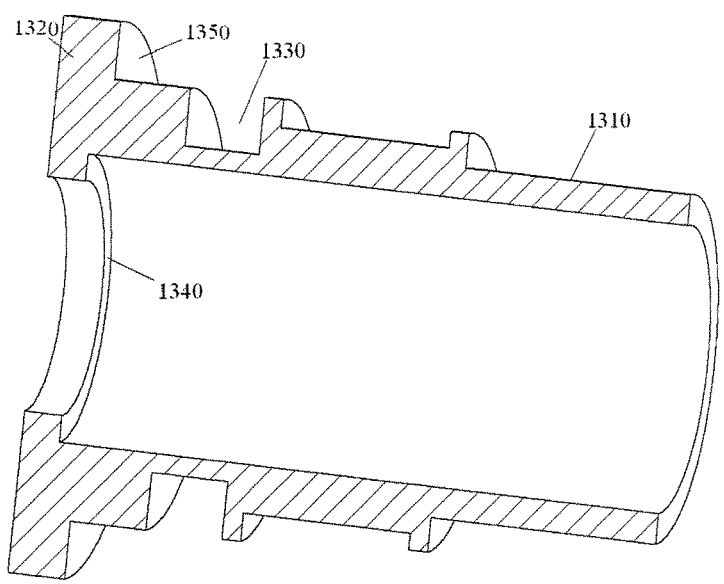
FIG. 15 is an enlarged cross section view of an outer tube of FIG. 12.
Figure 16:
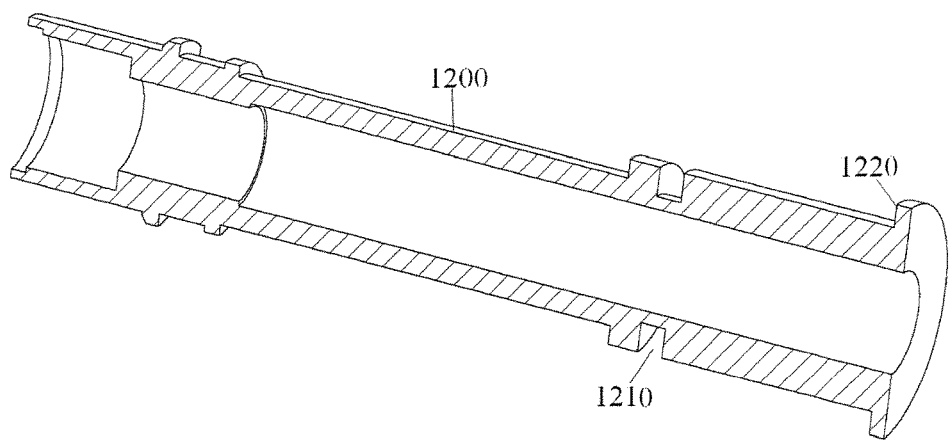
FIG. 16 is an enlarged cross section view of an inner tube of FIG. 12.

FIG. 15 is an enlarged cross section view of the outer tube 1300 of FIG. 12; and FIG. 16 is an enlarged cross section view of an inner tube 1200 of FIG. 12.

As shown in FIGS. 12-13 and 15-16, the fiber optic connector 1000 further comprises an inner tube 1200 passing through the outer tube 1300 and having a first end inserted into a housing 1100 of the fiber optic connector 1000. A buffer spring 1400 is provided between an outer flange 1220 on an outer wall of a second end of the inner tube 1200 and an inner flange 1340 (see FIG. 15) on an inner wall of the second end of the outer tube 1300.

As shown in FIGS. 12-13 and 15-16, a slot 1210 is formed in the outer wall of the inner tube 1200, and a block ring 1700 is received in the slot 1210. The outer tube 1300 is formed with an radial outer protrusion 1320 at the second end of the outer tube 1300, and the radial outer protrusion 1320 is limited between an radial inner protrusion 3300 of the outer shield 3000 and the block ring 1700 to prevent the outer tube 1300 and the buffer spring 1400 from being disengaged from the inner tube 1200.

In an exemplary embodiment of the present invention, the inner tube 1200 may be made of metal.

As shown in FIGS. 13-15, the radial outer protrusion 1320 of the outer tube 1300 has a first axial force carrying face 1350 (see FIG. 15), and the radial protrusion 3300 of the outer shield 3000 has a second axial force carrying face 3320 (see FIGS. 13-14) facing the first axial force carrying face 1350. As shown in FIG. 13, when the optical cable 200 is pulled outward by an external force, the first axial force carrying face 1350 of the outer tube 1300 abuts against the second axial force carrying face 3320 of the outer shield 3000 to prevent the fiber optic connector 1000 from being pulled out of the outer shield 3000 and prevent the external force from being transferred to the inner tube 1200 and a ferrule (not indicated, which is received in the housing 1100) of the fiber optic connector 1000.

As shown in FIGS. 12-13, the fiber optic connector 1000 may further comprise a crimp tube 1500 for crimping Kevlar elements of the optical cable 200 on the first end 1310 of the outer tube 1300 to prevent the external force exerted on the optical cable 200 from being transferred to the ferrule of the fiber optic connector.

In an exemplary embodiment of the present invention, an outer surface of the first end 1310 of the outer tube 1300 is knurled to enhance a friction engagement force with the crimp tube 1500 and reliably hold the Kevlar elements of the optical cable 200 on the outer tube 1300.

In the above various embodiments of the present invention, the outer shield 3000 provides a simple and reliable seal structure, and the fiber optic connection seal assembly may reach a classification of waterproof IP68. Furthermore, once the outer shield 3000 is screwed onto the fiber optic adapter 2000, the fiber optic connector 1000 is reliably positioned in the outer shield 3000 and cannot be pulled out of the outer shield 3000 under the external force, therefore, the seal performance of the assembly is independent of the external force exerted on the optical cable 200. Moreover, the outer shield 3000 can limit a movement of the outer tube 1300 on which Kevlar elements of the optical cable 200 are crimped so as to prevent the external force exerted on the optical cable 200 from being transferred to the ferrule of the fiber optic connector 1000, therefore, the optical performance of the fiber optic connector 1000 is not affected by the external force.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that more kinds of fiber optic connection assembly can be achieved with overcoming the technical problem of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connection assembly comprising:
   an enclosure extending along an axis between a first closed end and a second open end, the enclosure including a first body, a second body that is a separate piece from the first body, and an elastic sleeve, the first body defining the first closed end of the enclosure, the second body coupled to the first body opposite the first closed end, the second body defining a plurality of holes, the second body including a sleeve mount, and the elastic sleeve coupled to the sleeve mount, at least a portion of the second body being disposed along the axis between the first body and the elastic sleeve so that the first body, the second body, and the sleeve each form part of an exterior of the enclosure, the elastic sleeve defining a single opening at the second open end of the enclosure;
   an input cable extending between a first end and a second end, the input cable including an optical fiber, the first end of the input cable extending into the enclosure through the single opening defined by the elastic sleeve, the input cable also extending through one of the holes defined by the second body, the second end of the input cable being hermetically terminated at a multi-fiber optic connector having a dust cap; and
   a plurality of output cables that each extend between a respective first end and a respective second end, each of the output cables being optically coupled to the input cable, each of the first ends of the output cables extending into the enclosure through the single opening defined by the elastic sleeve, each of the output cables also extending through one of the holes defined by the second body, and each of the second ends of the output cables being sealed by a respective sealing cap.

2. The fiber optic connection assembly of claim 1, wherein the first closed end defined by the first body is contoured to have a smaller transverse cross-section than a remainder of the first body.

3. The fiber optic connection assembly of claim 2, wherein the remainder of the first body is generally rectangular.

4. The fiber optic connection assembly of claim 1, wherein the elastic sleeve extends fully along a width and a height of the second body.

5. The fiber optic connection assembly of claim 1, wherein each output cable includes a single optical fiber.

6. The fiber optic connection assembly of claim 1, wherein the input cable includes a plurality of optical fibers.

7. The fiber optic connection assembly of claim 1, wherein a splitter is disposed within the enclosure, the splitter optically coupling the input cable to the output cables.

8. The fiber optic connection assembly of claim 1, wherein an interior of the enclosure is hermetically sealed.

9. The fiber optic connection assembly of claim 1, wherein the sealing cap of each output cable is twistably locked to the second end of the output cable.

10. The fiber optic connection assembly of claim 9, wherein the sealing cap of each output cable is threadably coupled to the second end of the output cable.

11. The fiber optic connection assembly of claim 1, wherein the second end of each output cable is terminated by a single-fiber optical connector.

12. The fiber optic connection assembly of claim 11, wherein an optical adapter is coupled to the single-fiber optical connector.

13. The fiber optic connection assembly of claim 12, wherein an outer shield is mounted over the optical adapter.

14. The fiber optic connection assembly of claim 1, wherein the sleeve mount has a smaller transverse cross-section than the portion of the second body spacing the elastic sleeve from the first body.

15. The fiber optic connection assembly of claim 1, wherein the elastic sleeve snaps over the sleeve mount of the second body.

16. The fiber optic connection assembly of claim 1, wherein the elastic sleeve extends between opposite first and second ends, the first end being coupled to the sleeve mount of the second body, the second end having a smaller transverse cross-section than the first end.

17. The fiber optic connection assembly of claim 1, wherein the input cable is shorter than the output cables.

18. The fiber optic connection assembly of claim 1, wherein the output cables extend from the elastic sleeve in two rows.

19. The fiber optic connection assembly of claim 1, wherein the second body includes a first pressing plate, a second pressing plate, and a seal disposed between the first and second pressing plates.

20. The fiber optic connection assembly of claim 19, wherein the seal includes a gel block.

\* \* \* \* \*